United States Patent [19]
Bogue et al.

[11] Patent Number: 5,360,958
[45] Date of Patent: Nov. 1, 1994

[54] WELDING APPARATUS HAVING COAXIAL WELDING ELECTRODES

[75] Inventors: Terry L. Bogue, Windfall; Hollis D. Osborne, Kokomo, both of Ind.

[73] Assignee: Delco Electronics Corporation, Kokomo, Ind.

[21] Appl. No.: 61,469

[22] Filed: May 17, 1993

[51] Int. Cl.⁵ ............................................. B23K 11/24
[52] U.S. Cl. .................... 219/86.51; 219/56.21; 219/86.9; 219/110
[58] Field of Search ............... 219/56, 56.1, 56.21, 219/56.22, 86.51, 86.9, 110

[56] References Cited

U.S. PATENT DOCUMENTS

| | | | |
|---|---|---|---|
| 2,967,228 | 1/1961 | Tindall | 219/119 |
| 3,089,020 | 5/1963 | Hurlebaus | 219/86.9 |
| 3,309,494 | 3/1967 | Herbert et al. | 219/85 |
| 3,342,972 | 9/1967 | Penberg | 219/119 |
| 3,348,018 | 10/1967 | Wood | 219/86.9 |
| 3,435,181 | 3/1969 | Walkow | 219/86.9 |
| 3,519,782 | 7/1970 | Mallery | 219/78 |
| 3,553,420 | 1/1971 | Shearer et al. | 219/110 |
| 3,596,044 | 7/1971 | Katzin | 219/86.9 |
| 3,751,624 | 8/1973 | Banks et al. | 219/86.9 |
| 3,822,373 | 7/1974 | Arnett | 219/56 |
| 3,912,900 | 10/1975 | Arnett | 219/91 |
| 4,171,477 | 10/1979 | Funari | 219/56.21 |
| 4,230,925 | 10/1980 | Lascelles | 219/56.1 |
| 4,418,264 | 11/1983 | Thorwarth | 219/86.9 |
| 4,419,558 | 12/1983 | Stiebel | 219/109 |
| 4,447,700 | 5/1984 | Cohen | 219/117.1 |
| 4,484,056 | 11/1984 | Rossell | 219/86.51 |
| 4,582,973 | 4/1986 | Richards | 219/56.1 |
| 4,678,887 | 7/1987 | Nagel et al. | 219/117.1 |
| 4,831,228 | 5/1989 | Schumacher | 219/86.22 |
| 4,910,376 | 3/1990 | Riley et al. | 219/86.9 |
| 5,063,279 | 11/1991 | Rossi | 219/86.51 |
| 5,138,127 | 8/1992 | Fries et al. | 219/86.51 |

*Primary Examiner*—Clifford C. Shaw
*Attorney, Agent, or Firm*—Creighton R. Meland; Mark A. Navarre

[57] ABSTRACT

A resistance welding apparatus for welding a wire to a metallic pad of an integrated circuit. The welding apparatus has coaxial welding electrodes with the outer electrode being in the form of a tube. The inner electrode is a cylindrical rod and is located in the outer electrode. The end of the outer electrode has two opposed open-ended V-shaped slots. The slots receive and position the wire. With the wire located in the slots, the end of the outer electrode is engaged with the pad and the inner electrode pushes the wire against the pad. Welding current can now be applied to the electrodes. Each electrode is associated with a load cell that senses electrode force. Welding current is applied to the electrodes only after the electrode force of each electrode attains certain predetermined values.

3 Claims, 3 Drawing Sheets

WELDING APPARATUS HAVING COAXIAL WELDING ELECTRODES

This invention relates to resistance welding apparatus and more particularly to welding apparatus that has coaxial welding electrodes.

In the fabrication of hybrid integrated circuits, small diameter wires are resistance welded to electrical components such as a metallic conductor pad. By way of example, a wire having a diameter of about 0.015 inches may be required to be welded to a rectangular metallic pad of about 0.152 inches by 0.084 inches. This type of welding therefore requires welding apparatus that can precisely properly position the wire relative to the pad and force the wire into tight engagement with the pad by means of a welding electrode.

It accordingly is a general object of this invention to provide a welding apparatus that is capable of properly positioning and holding a wire over a metallic pad where the welding apparatus has a welding electrode that forces the wire into engagement with the pad. More specifically, welding apparatus made in accordance with this invention has coaxial welding electrodes. The outer electrode is a cylindrical tube and a cylindrical rod-like inner electrode is disposed within the tube. The electrodes are electrically insulated from each other by a tubular electrical insulator. The end of the outer electrode has a pair of opposed V-shaped openings or slots. When the outer electrode moves toward the pad, the V-shaped slots capture a wire that is to be welded to the pad. The V-shaped slots properly position and hold the wire for welding to the pad. The outer electrode is moved to a position where end surface portions of the outer electrode tightly engage the pad to thereby provide a good electrical connection between the outer electrode and the pad. The V-shaped slots hold the wire in a position where it is aligned with the end of the inner electrode and the inner electrode is now moved relative to the outer electrode to force the wire into tight engagement with the pad. Welding current is now applied to the electrodes to cause the wire to be resistance welded to pad.

In accordance with another aspect of this invention, the inner and outer electrodes are associated with electrical force sensors such as load cells. During welding with the outer electrode engaging the pad and the inner electrode forcing the wire into engagement with the pad, electrode force is determined by the load cells. When electrode force of both electrodes is respectively within certain predetermined ranges, welding current is applied to the electrodes. No welding current is applied to the electrodes before the electrode force of each electrode is within a certain range.

IN THE DRAWINGS

Figure 1:
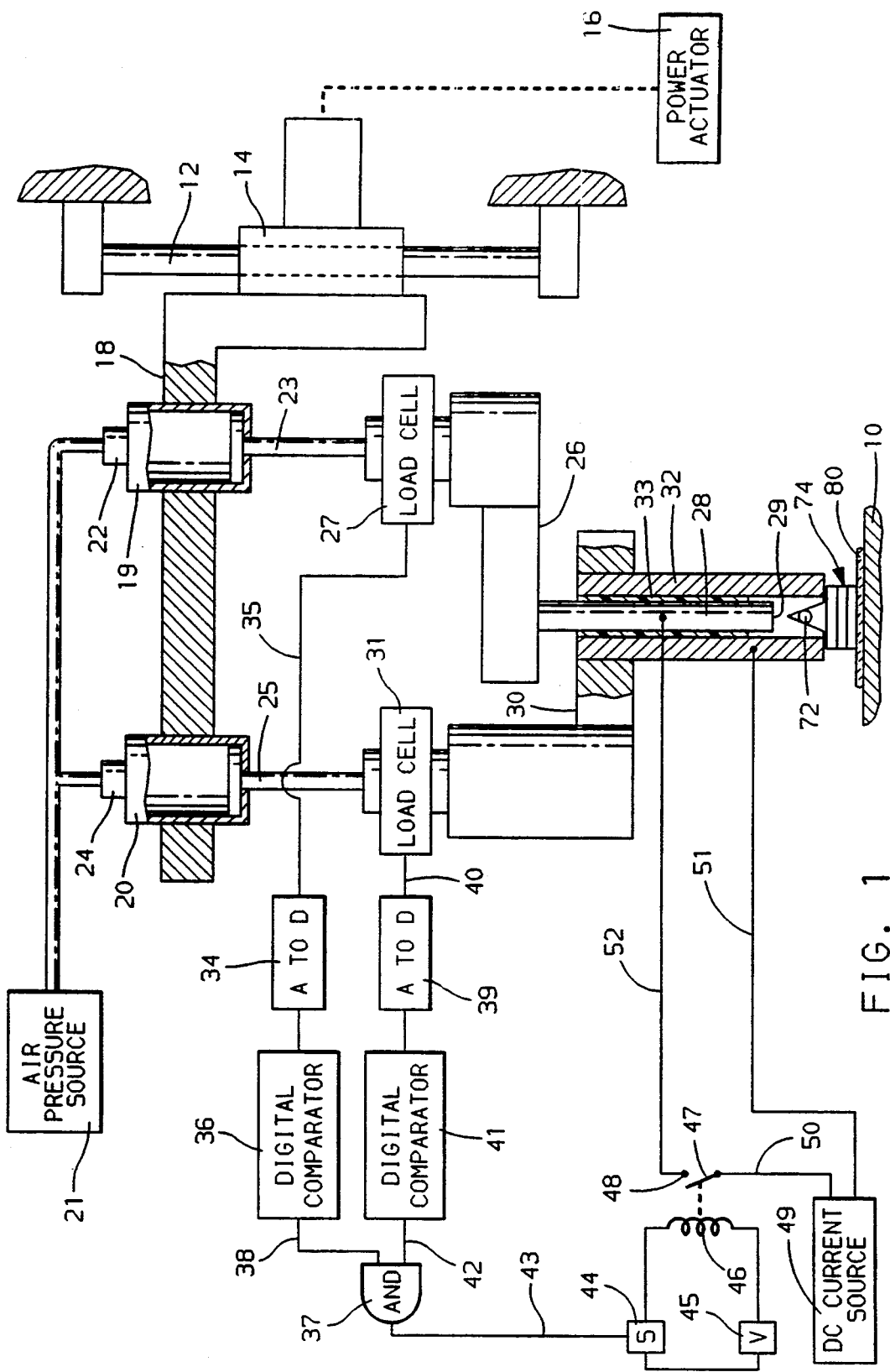
FIG. 1 illustrates welding apparatus made in accordance with this invention.

Referring now to the drawings and more particularly to FIG. 1, a welding apparatus made in accordance with this invention is illustrated. The welding apparatus comprises a support 10 for supporting an integrated circuit in a manner that will be more fully described hereinafter. The welding machine or apparatus has a fixed rod 12 that is secured to the frame of the machine. The rod 12 slidably supports a part 14. The part 14 can be moved vertically in FIG. 1 relative to fixed rod 12 by a power actuator 16 that can take the form of a conventional power operated cam.

The part 14 is rigidly connected to an arm 18 so that arm 18 moves with part 14.

The arm 18 is rigidly connected to two air cylinders designated respectively as 19 and 20 that operate as dash pots and constant force springs. The cylinder 19 is connected to an air pressure source 21 through a servo controlled air pressure regulator 22. The air pressure regulator 22 causes a constant force of, for example, six pounds to be developed by piston rod 23.

Cylinder 20 is connected to air pressure source 21 through a servo controlled air pressure regulator 24. The air pressure regulator 24 causes a constant force to be developed by piston rod 25 that is higher than the force developed by piston rod 23. By way of example, the force developed by piston rod 25 may be about 8 pounds.

The piston rod 23 is connected to an electrode holder 26 through a load cell 27 that operates as an electrode force sensor in a manner that will be more fully described hereinafter. A welding electrode 28 is attached to holder 26 and moves with movement of holder 26. The welding electrode 28 is a cylindrical rod and is formed of a copper and tungsten alloy. As will be described in more detail hereinafter, vertical movement of parts 14 and 18 causes electrode 28 to move vertically with movement of part 14. Electrode 28 has a circular end surface 29.

The piston rod 25 is connected to another electrode holder 30 through a load cell 31 that operates as an electrode force sensor. A welding electrode 32 is attached to holder 30. The welding electrode 32 is a cylindrical tubular part and is formed of the same material as electrode 28, namely a copper and tungsten alloy. A tubular insulator 33 formed of electrical insulating material is secured to the inner cylindrical surface of electrode 28. The inner electrode 28 is located inside of insulator 33. The insulator 33 serves to electrically insulate the electrodes 28 and 32 from each other. Vertical movement of part 14 causes electrode 32 to move vertically with movement of part 14.

The load cells 27 and 31 are of the strain gauge type that develop direct analog voltages that are a function of electrode force. The load cells 27 and 31 may be Transducer Techniques Type No. MLP-20 load cells.

The output analog direct output voltage of load cell 27 is applied to an analog to digital converter 34 by line 35. The output of converter 34 is applied to the input of a digital comparator 36. The output of comparator 36 is applied to one input of AND gate 37 by line 38.

The load cell 31 is connected to the input of another analog to digital converter 39 by line 40. The output of converter 39 is applied to the input of digital comparator 41. The input of digital comparator 41 is applied to another input of AND gate 37 by line 42.

The output of AND gate 37 is connected to a line 43 which, in turn, is connected to a semiconductor switch 44. When AND gate 37 applies a control signal to line 43, this control signal biases the semiconductor switch 44 to a conductive state.

The switch 44 is connected in series with a source of voltage 45 and the coil 46 of a relay. The coil 46 operates the movable contact 47 of the relay. When switch 44 is conductive, relay coil 46 is energized which causes movable contact 47 to be moved into engagement with the fixed constant 48 of the relay.

The movable contact 47 is connected to one side of a source of direct welding current 49 by line 50. One side of the source of welding current is electrically connected to outer welding electrode 32 by line 51. The fixed contact 48 is connected to inner welding electrode 28 by a line 52. Whenever contact 47 engages contact 48, direct welding current is applied to electrodes 28 and 32.

When the electrode force of electrode 28 is about 8 pounds, the system causes the digital comparator 36 to apply an input signal to AND gate 37. Thus, the load cell develops an analog direct voltage and when this voltage corresponds to an electrode force of about 8 pounds, a digital signal corresponding to 8 pounds of force is applied to comparator 36. Comparator 36 compares the digital signal to a reference window and when the electrical force is about 8 pounds, the comparator 36 develops an output signal that is applied to AND gate 37.

In a similar fashion, when the electrode force of inner electrode 28 reaches about 6 pounds, the comparator 41 develops an output signal that is applied to the other input of AND gate 37.

It can be appreciated from the foregoing that welding current is not applied to electrodes 28 and 32 until the electrode force of electrode 32 reaches 8 pounds and the electrode force of electrode 28 reaches 6 pounds. Putting it another way, both electrodes must have attained their respective force values before welding current is applied to the electrodes.

The end of tubular electrode 32 has two identical open-ended V-shaped opposed slots designated respectively as 56 and 58 that extend entirely through the tubular wall of electrode 32. Slot 56 is defined by surfaces 60 and 62 and slot 58 is defined by surfaces 64 and 66.

The end of electrode 32 has opposed end surfaces 68 and 70 located between the V-shaped slots. The surfaces 68 and 70 are normal to the longitudinal axis of electrode 32.

The welding apparatus welds a nickel wire to a conductor pad of a hybrid integrated circuit. The wire is designated as 72 and has a diameter of about 0.015 inches.

The conductor pad has been generally designated as 74. It is formed of nickel plated steel. The lower portion of pad 74 is rectangular and it has a lower flat surface 76. The pad 74 has a ridge portion 78.

Figure 2:
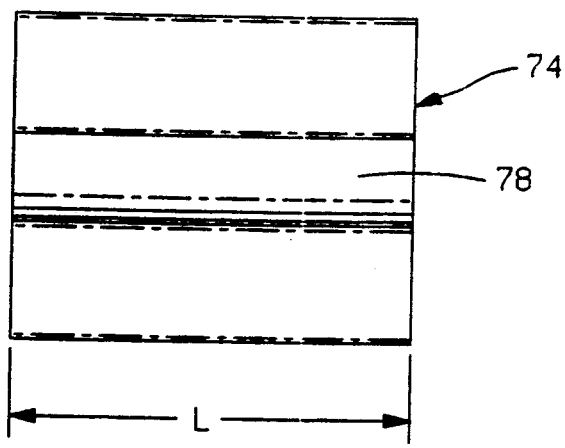
FIG. 2 is a top view of a metallic conductive pad.
Figure 3:
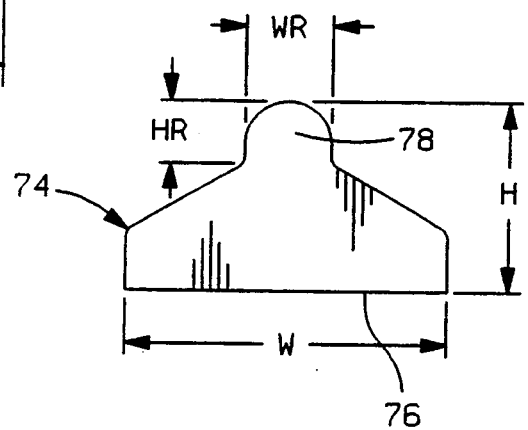
FIG. 3 is an end view of the pad shown in FIG. 2.

The dimensions of pad 74 will now be described with the aid of FIGS. 2 and 3. The length L of pad 74 may be about 0.152 inches. The width W may be about 0.084 inches. The total height H may be about 0.035 inches. The width WR of ridge 78 may be about 0.015 inches. The height HR of the ridge 78 may be about 0.020 inches.

Figure 7:
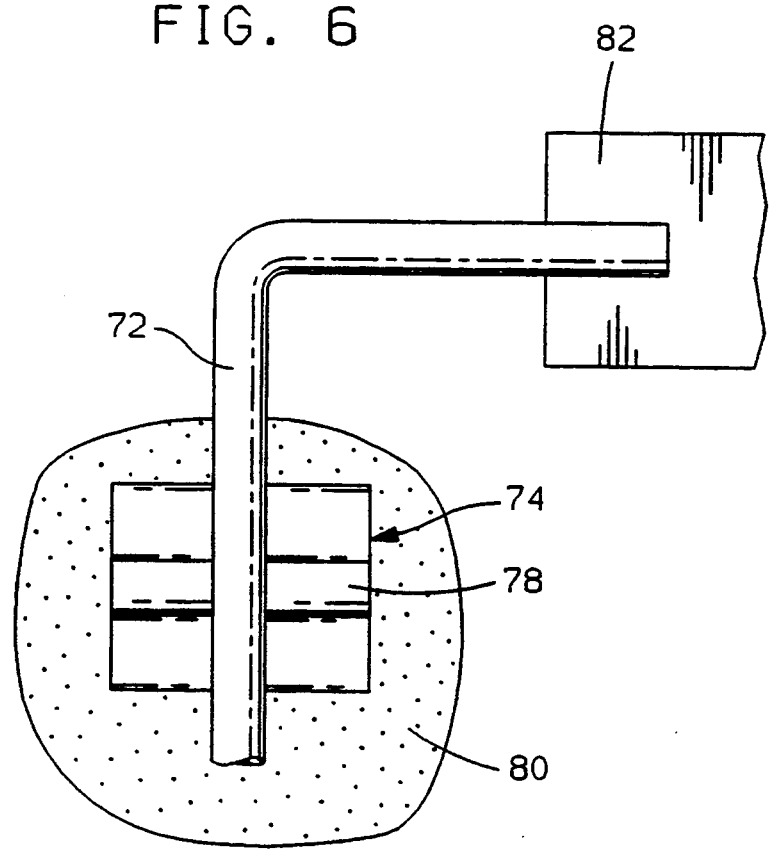
FIG. 7 illustrates a wire connected to a terminal of an electrical component and the pad to which the wire is welded.

The pad 74 is supported and secured to a ceramic substrate 80 shown in FIGS. 1 and 7. The pad 74 and substrate 80 are parts of a hybrid integrated circuit which includes a housing that supports the parts of the integrated circuit. The housing and the entire integrated circuit has not been illustrated to simplify the disclosure of this invention.

The integrated circuit assembly may include, for example, a semiconductor pressure sensor for automotive use. This sensor has housing lead 82 which is connected to nickel wire 72 as shown in FIG. 7.

The manner in which the wire 72 is welded to pad 74 will now be described. Prior to welding, the wire 72 is bent by ninety degrees so that it takes the position shown in FIG. 7. The integrated circuit is now indexed into the weld station so that the pad 74 is indexed to the position shown in FIG. 1. When this indexing occurs, the electrodes 28 and 32 are retracted and are in the "home" position, which is not illustrated in the drawings. In this retracted or at home position, the lower ends of electrodes 28 and 32 are located above the wire 72 by an amount that is sufficient to allow the wire 72 to be indexed into a position for welding to pad 74 without interfering with the lower end of electrode 32.

Figure 4:
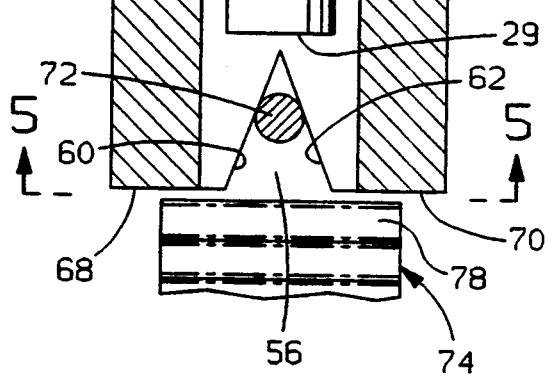
FIG. 4 is an enlarged view of a portion of the welding apparatus shown in FIG. 1.
Figure 5:
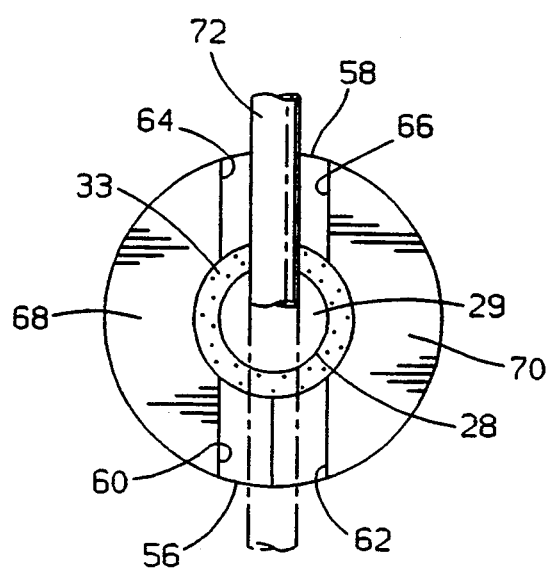
FIG. 5 is a view looking in the direction of arrows 5—5 in FIG. 4.

With the wire 72 in position to be welded, parts 14 and 18 are moved downward in FIG. 1 to cause electrodes 32 and 28 to move downward. As the electrode 32 moves downward, the wire 72 will eventually enter the V-shaped slots 56 and 58 in the end of electrode 32. The open ends of these slots are wide enough to accommodate the range of positions the wire might take after bending and indexing. As electrode 32 continues to move down, the wire is captured in the V-shaped slots or, in other words, engages the surfaces that define the V-shaped slots. This is depicted in FIG. 4 which shows wire 72 captured in the V-shaped slots. FIG. 4 also illustrates the position of electrodes 28 and 32 just prior to the time that end surfaces 68 and 70 of electrode 32 engage ridge 78 of pad 74.

As the electrodes 28 and 32 continue to move down portions of electrode surfaces 68 and 70 will engage the ridge 78 of pad 74 and these surfaces are forced tightly against ridge 78. At this point in the downward movement of arm 18, the cylinder or dash pot 19 is the over travel link between part 18 and electrode 32.

As part 18 continues to move downward, the force on electrode 32 is limited to 8 pounds by the regulated air in the dash pot cylinder 19. As the downward stroke continues, the inner electrode 28 continues to move downward pushing the wire 72 into engagement with the ridge 78 of pad 74. At this point, the dash pot cylinder 20 is the over travel link between arm 18 and inner electrode 28.

Figure 6:
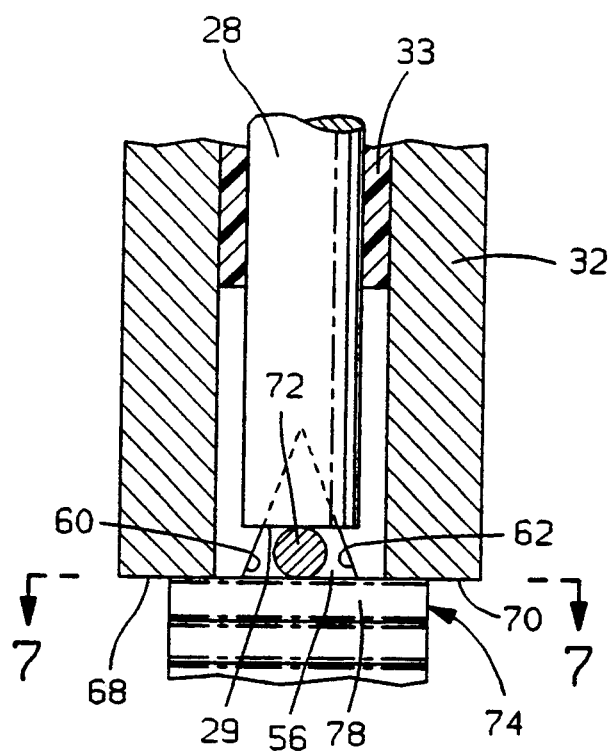
FIG. 6 is a view similar to FIG. 4, but showing the welding electrodes in a position to weld a wire to a pad.

FIG. 6 shows the electrodes 28 and 32 at full depth. At this point, the dash pot 19 for the outer electrode 32 has over travelled by a small amount, for example 0.25 inches and the dash pot 20 for the inner electrode 28 has over travelled a smaller amount, for about 0.17 inches.

In the position of the electrodes shown in FIG. 6, the inner electrode 28 forces the wire 72 into tight engagement with pad 74 and outer electrode 32 is forced into tight engagement with pad 74. The electrode force of each electrode is now checked by the load cells 27 and 31. When the force on outer electrode 32 reaches 8 pounds and the force on inner the inner electrode reaches 6 pounds, the relay contact 47 is moved to a closed position and consequently, direct welding current is applied to electrodes 28 and 32.

The current path for welding current is from line 52 to inner electrode 28, then through electrode 28 and wire 72 to pad 74, then from pad 74 to portions of surfaces 68 and 70 of electrode 32 that engage pad 74 and then from electrode 32 to line 51. The direct current through wire 72 and pad 74 causes a resistance weld to be made between wire 72 and pad 74.

The embodiments of the invention in which an exclusive property or privilege is claimed are defined as follows:

1. A resistance welding apparatus for welding a wire to a metallic conductor pad comprising, an outer tubular metallic welding electrode and an inner cylindrical metallic welding electrode recessed within said outer metallic welding electrode, and an electrical insulator disposed between said electrodes for electrically insulating said electrodes from each other, said outer electrode having a pair of opposed V-shaped slots for capturing said wire and positioning said wire in alignment with said pad and said inner electrode in preparation for welding said wire to said pad, said outer electrode having a pair of spaced surfaces for engaging said conductor pad and said inner electrode adapted to move axially within said outer electrode to maintain said wire in tight engagement with said pad when said wire is welded to said pad.

2. A resistance welding apparatus for welding a wire to a metallic conductor pad including an outer tubular metallic welding electrode, an inner cylindrical metallic welding electrode recessed within said outer metallic welding electrode, and an electrical insulator disposed between said electrodes for electrically insulating said electrodes from each other, the improvement wherein:
a pair of opposed V-shaped slots are formed in said outer electrode for capturing said wire and positioning said wire in alignment with said pad and said inner electrode in preparation for welding said wire to said pad.

3. A resistance welding apparatus for welding a wire to a metallic pad comprising, a first metallic welding electrode for engaging and forcing said wire into engagement with a surface of said pad, a second metallic welding electrode coaxial with and disposed about said first welding electrode for directly engaging said surface of said pad and having a pair of opposed slots for receiving and positioning said wire for engagement with said first electrode, a first electrode force sensor associated with said first electrode for sensing the force of said first electrode, a second electrode force sensor associated with said second electrode for sensing the force of said second electrode, a source of welding current, means electrically connecting said source of welding current to said electrodes including at least one switching means, and means for causing said switching means to apply welding current to said electrodes when the force of said first electrode has a first predetermined value and when the force of said second electrode has a second predetermined value.

* * * * *